(No Model.)
H. W. & A. F. COLE.
GAS LAMP.
No. 465,350. Patented Dec. 15, 1891.
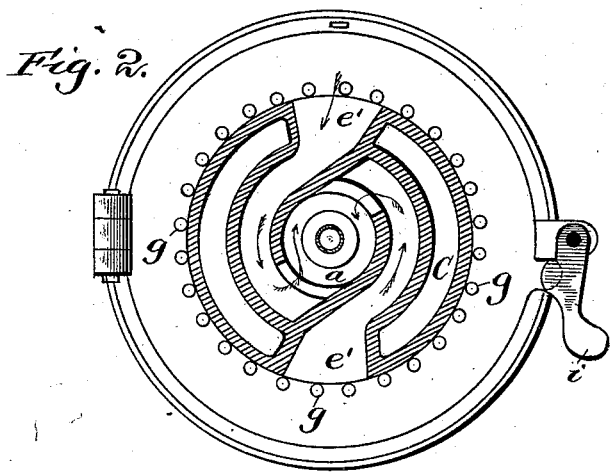
Fig. 2.
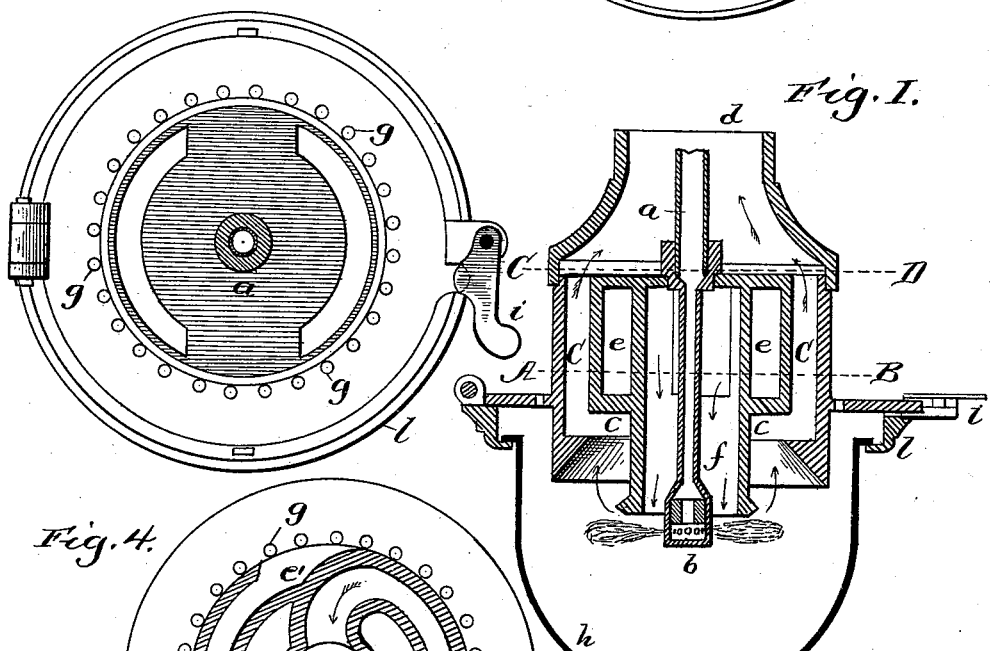
Fig. 3.
Fig. 1.
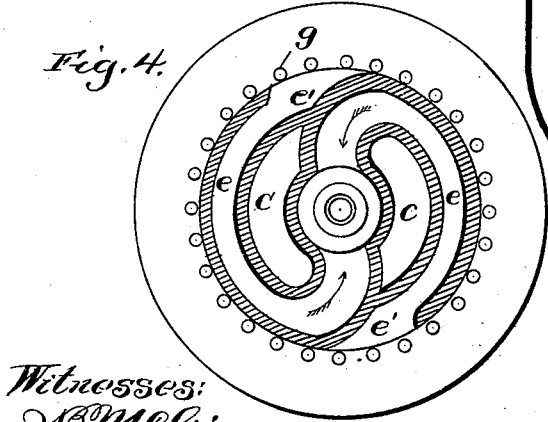
Fig. 4.
Witnesses:
J. B. McGirr.
H. C. Tanner
Henry W. Cole
Albert F. Cole
Inventors
By Connolly Bros.
Attys

UNITED STATES PATENT OFFICE.

HENRY WILLIAM COLE AND ALBERT FREDERICK COLE, OF STOURPORT, ASSIGNORS TO EDWARD CURTIS KEMP, CLIFFORD WILLIAM KEMP, AND HENRY HERBERT WRIGHT, OF BIRMINGHAM, ENGLAND.

GAS-LAMP.

SPECIFICATION forming part of Letters Patent No. 465,350, dated December 15, 1891.

Application filed May 1, 1890. Serial No. 350,242. (No model.) Patented in England August 27, 1887, No. 11,669.

*To all whom it may concern:*

Be it known that we, HENRY WILLIAM COLE and ALBERT FREDERICK COLE, subjects of the Queen of Great Britain, residing at Raven Street, Stourport, in the county of Worcester, England, have invented certain new and useful Improvements in Gas-Lamps, (for which we obtained Letters Patent in Great Britain, No. 11,669, dated August 27, 1887;) and we do hereby declare the following to be a full, clear, and exact description of the invention, reference being had to the accompanying drawings, which form part of this specification.

This invention relates to an improvement in the construction and arrangement of the air-passages of inverted-burner regenerative gas-lamps applicable for ventilating and lighting purposes generally. In the construction of this said lamp we use circular or tangential hot-air passages terminating in central hot-air tubes, which surround and supply the top side of the flame with highly-heated air. Gas is conveyed down the central hot-air tube through a smaller pipe and is there heated in its descent to the burner. The combustion-chamber is arranged in a circle outside the hot-air passages, while the heat of the flame and products of combustion on their course to the chimney thus highly heats the air passing through the said hot-air passages to the flame. These passages have a large amount of heating-surface in them exposed to the action of the said heat and flame. A ring which holds the glass in position is made, preferably, a little larger in diameter than the body of the lamp for the purpose of supplying air to the under side of the flame, while the lamp is lighted either by opening the glass in the usual manner or by means of a movable plug, cover or equivalent, situated in the bottom of the glass, which, however, forms no part of this invention, and we preferably regulate the supply of gas to the burner by any usual means to insure a steady and uniform light.

Figure 1 of the accompanying drawings represents a vertical section of a gas-lamp in action connected and arranged according to our invention. Fig. 2 represents a horizontal section on the dotted lines A B, Fig. 1, while Fig. 3 represents a horizontal section on the dotted lines C D of the said Fig. 1. Fig. 4 is a horizontal plan view of a modification.

Gas passes down the pipe $a$ to burner $b$ and issuing out through the holes of the burner forms a round flame, the heat and products of combustion from the flame on passing up the combustion-chamber $c$ to the chimney $d$, surround and impinge on the shoulders and walls of the hot-air chamber or box $e$, and also on the shoulders and around the hot-air passages $e'$, thereby highly heating the same. The air to supply the top side of the flame enters through the passages $e'$ round the circular or tangential passages in the chamber or box $e$ and down the center tube $f$ to the top of the flame. The large amount of heating-surface so exposed to the action of the heat and flame highly heats the air on its course from the passages $e'$ to the burner $b$. Air is supplied to the under side of the flame through the air-holes $g$ in the usual manner. The air passing through the air-holes $g$, descends down the sides of the glass $h$ and then rises, heated, to the flame. By the passages $e$ being circular or tangential a whirling motion is imparted to the heated air passing therethrough, and the heated air being properly regulated insures, practically, perfect combustion and a steady and brilliant light. The gas is lighted by moving the catch $i$ and opening the ring $l$, which holds the glass $h$ in position, or by opening a plug or cover $n$, as shown in the bottom of glass $h$ at $m$. In some cases it will be useful to permit a little air to pass through the bottom of glass at $m$ to the flame.

The lamp represented is shown as having two circular or tangential hot-air passages; but the number and size of such passages can be varied according to the size and requirements of lamp and the amount of heating-surface necessary.

Fig. 4 shows a horizontal plan of a modification in which the circular or tangential hot-air passages $e$ are formed round the combustion-chamber $c$ and then pass through $c$ to the center tube $f$. The gas passes through gas-pipe $a$ to the burner, and the gas when lighted forms a round flame, as before, and the heat and products of combustion pass up the combustion-chamber $c$ to the chimney, surrounds and impinges on the shoulders and walls of the circular or tangential passages $e$, and on $e'$ and tube $f$, thus highly heating the same. The air is greatly heated as it passes round the said passages $e$, through $e'$, and down the center tube $f$ to the top side of flame.

Having thus described our invention, we claim as new and desire to secure by Letters Patent—

In a regenerative gas-lamp, the combination of the vertical gas-pipe $a$, provided with a burner $b$ at its lower end, and the two vertical central air-supply chambers $f$ with the vertical segmental combustion-chambers $c$ $c$ inclosing the two opposite sides of said central air-supply chambers, and the segmental air-chambers $e$ $e$, parallel with said combustion-chambers and formed with tangential passages leading to said central air-supply chamber $f$, all constructed and arranged substantially as described.

In testimony that we claim the foregoing we have hereunto set our hands this 15th day of January, 1890.

HENRY WILLIAM COLE. [L. S.]
ALBERT FREDERICK COLE. [L. S.]

Witnesses:
HENRY SKERRETT,
    *Of Birmingham.*
E. HARKER,
    *U. S. Consulate.*